US011747680B2

(12) United States Patent
Lin et al.

(10) Patent No.: US 11,747,680 B2
(45) Date of Patent: Sep. 5, 2023

(54) DISPLAY PANEL

(71) Applicant: Au Optronics Corporation, Hsinchu (TW)

(72) Inventors: Yi-Hsin Lin, Hsinchu (TW); Chao-Wei Huang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/225,134

(22) Filed: Apr. 8, 2021

(65) Prior Publication Data

US 2022/0011612 A1 Jan. 13, 2022

Related U.S. Application Data

(60) Provisional application No. 63/049,250, filed on Jul. 8, 2020.

(30) Foreign Application Priority Data

Nov. 30, 2020 (TW) ................................ 109141979

(51) Int. Cl.
*G02F 1/1339* (2006.01)
*G02F 1/1335* (2006.01)
(Continued)

(52) U.S. Cl.
CPC ........ *G02F 1/1339* (2013.01); *G02F 1/13398* (2021.01); *G02F 1/133512* (2013.01);
(Continued)

(58) Field of Classification Search
CPC ............... G02F 1/1339; G02F 1/13398; G02F 1/133512; G02F 1/133528;
(Continued)

(56) References Cited

U.S. PATENT DOCUMENTS 5,910,829 A * 6/1999 Shimada ........... G02F 1/133512 349/110
6,437,846 B1 * 8/2002 Ono .................... G02F 1/13452 349/149
(Continued)

FOREIGN PATENT DOCUMENTS

CN 101630085 1/2010
CN 103969867 8/2014
(Continued)

*Primary Examiner* — Hoan C Nguyen
(74) *Attorney, Agent, or Firm* — JCIPRNET

(57) ABSTRACT

A display panel includes a first substrate, pixel structures, a second substrate, a display medium, a first sealant, and a second sealant. The first substrate includes an active area and a peripheral area outside the active area. The pixel structures are disposed on the active area of the first substrate. The second substrate is disposed opposite to the first substrate. The first sealant is disposed between the first substrate and the second substrate, and is located on the peripheral area of the first substrate. The second sealant is disposed on a side wall of the first substrate and a side wall of the second substrate. The second sealant includes a convex surface overlapped with the side wall of the first substrate and the side wall of the second substrate.

11 Claims, 16 Drawing Sheets

(51) Int. Cl.
*G02F 1/1362* (2006.01)
*G02F 1/1368* (2006.01)

(52) U.S. Cl.
CPC ...... *G02F 1/133528* (2013.01); *G02F 1/1368* (2013.01); *G02F 1/133562* (2021.01); *G02F 1/133567* (2021.01); *G02F 1/136222* (2021.01); *G02F 1/136286* (2013.01)

(58) Field of Classification Search
CPC ......... G02F 1/133567; G02F 1/136222; G02F 1/133562; G02F 1/136286; G02F 1/1368; G02F 1/161; G02F 1/133308; G02F 2202/28; G02F 1/13394; G02F 1/133351; G02F 1/1341; G02F 1/1345; G02F 1/133331; G02F 2201/50; G02B 6/0086; G02B 6/0088; C09J 11/06; C09J 4/00; C09J 2301/312; C09K 3/10
See application file for complete search history.

(56) References Cited

U.S. PATENT DOCUMENTS 8,199,272 B2 6/2012 Wang et al.
9,057,917 B2 6/2015 Choi et al.
9,445,518 B2 9/2016 Yoon et al.
9,488,857 B2 11/2016 Bornstein et al.
9,759,950 B2 9/2017 Kim et al.
2004/0201814 A1* 10/2004 Yamamoto ........ G02F 1/133371 349/156
2006/0146265 A1* 7/2006 Park ...................... G02F 1/1341 349/153
2010/0188378 A1* 7/2010 Chiang ................ G09G 3/3648 345/94
2010/0214521 A1* 8/2010 Togashi ................ G02F 1/1339 349/153
2010/0225875 A1 9/2010 Wang et al.
2014/0036191 A1* 2/2014 Zhao ................. G02F 1/136286 349/46
2014/0160694 A1* 6/2014 Yoon ..................... G02F 1/1339 361/749
2014/0204293 A1* 7/2014 Kim ...................... G02F 1/1339 349/15
2015/0198838 A1 7/2015 Bornstein et al.
2016/0062182 A1* 3/2016 Cho .................. G02F 1/133528 359/483.01
2019/0204661 A1* 7/2019 Moon .................. H05K 5/0017
2020/0272010 A1* 8/2020 Lee ........................ G02F 1/1362
2021/0191188 A1* 6/2021 Yu ..................... G02F 1/133528

FOREIGN PATENT DOCUMENTS

CN 104134429 A * 11/2014
CN 104865741 8/2015
CN 104865741 A * 8/2015 ....... G02F 1/133512
CN 106554650 A * 4/2017 ............... C09D 4/00
CN 109459883 A * 3/2019 ........... G02B 6/0055
JP 2010139656 A * 6/2010
KR 20080073910 A * 8/2008
KR 101266740 5/2013
KR 2020127619 * 11/2020
TW 201033958 9/2010
TW 201423208 6/2014
TW 201536711 10/2015

* cited by examiner

DISPLAY PANEL

CROSS-REFERENCE TO RELATED APPLICATION

This application claims the priority benefits of U.S. application Ser. No. 63/049,250, filed on Jul. 8, 2020, and Taiwanese application no. 109141979, filed on Nov. 30, 2020. The entirety of each of the above-mentioned patent applications is hereby incorporated by reference herein and made a part of this specification.

BACKGROUND

Technical Field

The disclosure relates to a display panel.

Description of Related Art

As display technology thrives, people are no longer satisfied with optical properties such as high resolution, high contrast, and wide viewing angles regarding requirements for display devices. In addition, the display devices are expected to exhibit an elegant appearance, for example, a narrow border.

Generally speaking, the display device includes a non-self-luminous display panel and a backlight module beneath the non-self-luminous display panel. In order to realize a display device with a narrow border, and prevent a light beam emitted by the backlight module from leaking from a peripheral area of the non-self-luminous display panel, a light-blocking side sealant is formed on a side wall of the non-self-luminous display panel. However, when upper and lower substrates of the non-self-luminous display panel are misaligned, light leakage on the side is likely to arise.

SUMMARY

The disclosure provides a display panel with good performance.

In an embodiment of the disclosure, a display panel includes a first substrate, a plurality of pixel structures, a second substrate, a display medium, a first sealant, and a second sealant. The first substrate includes an active area and a peripheral area outside the active area. The pixel structures are disposed on the active area of the first substrate. The second substrate is disposed opposite to the first substrate. The display medium is disposed between the first substrate and the second substrate. The first sealant is disposed between the first substrate and the second substrate, and is located on the peripheral area of the first substrate. The second sealant is disposed on a side wall of the first substrate and a side wall of the second substrate. The second sealant includes a convex surface overlapped with the side wall of the first substrate and the side wall of the second substrate, and an optical density of the second sealant is greater than or equal to 0.68. In an embodiment, the optical density of the second sealant refers to a value measured when a film thickness of the second sealant is substantially equal to 160 μm.

In an embodiment of the disclosure, a display panel includes a first substrate, a plurality of pixel structures, a second substrate, a display medium, a first sealant, and a second sealant. The first substrate includes an active area and a peripheral area outside the active area. The pixel structures are disposed on the active area of the first substrate. The second substrate is disposed opposite to the first substrate. The display medium is disposed between the first substrate and the second substrate. The first sealant is disposed between the first substrate and the second substrate, and is located on the peripheral area of the first substrate. The second sealant is disposed on a side wall of the first substrate and a side wall of the second substrate. The second sealant includes a convex surface overlapped with the side wall of the first substrate and the side wall of the second substrate. The side wall of the first substrate is substantially aligned with the side wall of the second substrate.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
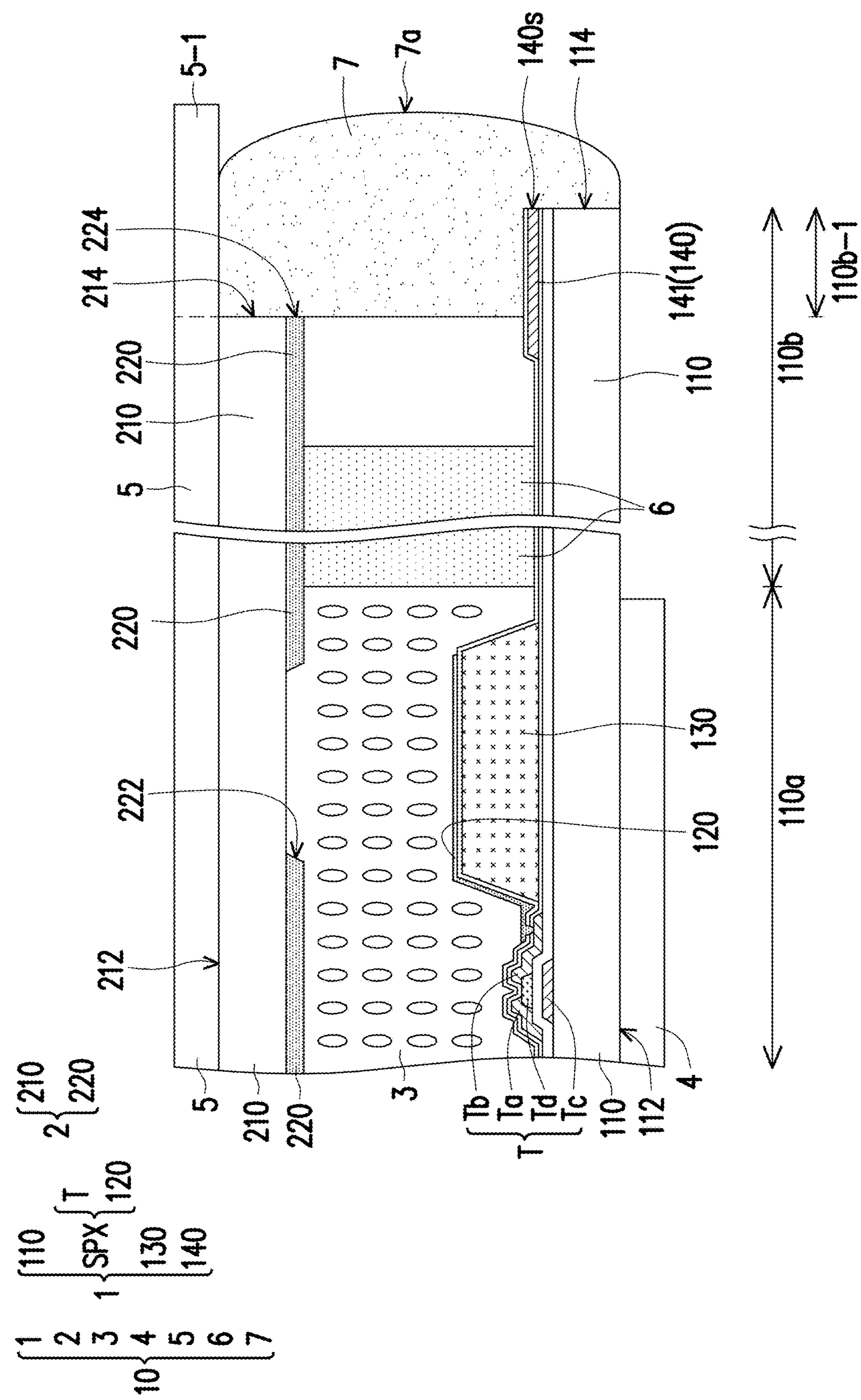
FIG. 1 is a schematic cross-sectional view of a display panel 10 according to an embodiment of the disclosure.

Reference will now be made in detail to exemplary embodiments of the disclosure, examples of which are illustrated in the accompanying drawings. Wherever possible, the same element symbols are used in the drawings and description to denote the same or similar parts.

It should be understood that when an element such as a layer, film, region, or substrate is referred to as being "on", or "connected to" another element, it may be directly on or connected to said another element, or intermediate elements may also be present. In contrast, when an element is referred to as being "directly on" or "directly connected to" another element, no intermediate elements are present. As used herein, the term "connected" may refer to physical connection and/or electrical connection. Furthermore, "electrically connected" or "coupled" may encompass the presence of other elements between two elements.

The term "about", "similar", or "substantially" as used herein is inclusive of the stated value and means within an acceptable range of deviation for the particular value as determined by people having ordinary skill in the art, considering the measurement in question and the error associated with measurement of the particular quantity (i.e., the limitations of the measurement system). For instance, "about" may mean within one or more standard deviations, or, for instance, ±30%, ±20%, ±10%, or ±5% of the stated value. Furthermore, a relatively acceptable range of deviation or standard deviation may be chosen for the term "about", "similar", or "substantially" as used herein based on optical properties, etching properties, or other properties, instead of applying one standard deviation across all the properties.

Unless otherwise defined, all terms (including technical and scientific terms) used herein have the same meaning as commonly understood by people of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless explicitly so defined herein.

FIG. 1 is a schematic cross-sectional view of a display panel 10 according to an embodiment of the disclosure.

With reference to FIG. 1, the display panel 10 includes a pixel array substrate 1, an opposite substrate 2, and a display medium 3. The pixel array substrate 1 includes a first substrate 110, the opposite substrate 2 includes a second substrate 210 disposed opposite to the first substrate 110, and the display medium 3 is disposed between the first substrate 110 and the second substrate 210.

For example, in this embodiment, the display medium 3 may include a non-self-luminous material (such as but not limited to liquid crystal). In addition, the display panel 10 may also include a first polarizer 4 and a second polarizer 5 respectively disposed on an outer surface 112 of the first substrate 110 and an outer surface 212 of the second substrate 210, and a backlight module (not shown) is disposed beneath the display panel 10.

In this embodiment, a material of the first substrate 110 may include glass, quartz, organic polymer, or other applicable materials. Also, a material of the second substrate 210 may include glass, quartz, organic polymer, or other applicable materials.

The pixel array substrate 1 includes the first substrate 110 and a plurality of pixel structures SPX. The first substrate 110 includes an active area 110*a* and a peripheral area 110*b* outside the active area 110*a*. The pixel structures SPX are disposed on the active area 110*a* of the first substrate 110.

Each of the pixel structures SPX includes a thin film transistor T and a pixel electrode 120 electrically connected to the thin film transistor T. The thin film transistor T includes a gate Tc, a semiconductor pattern Td, and a source Ta and a drain Tb which are electrically connected respectively to two different areas of the semiconductor pattern Td. The gate Tc of the thin film transistor T is electrically connected to one corresponding gate line GL (shown in FIG. 2), the source Ta of the thin film transistor T is electrically connected to one corresponding data line DL (shown in FIG. 2), and the drain Tb of the thin film transistor T is electrically connected to one corresponding pixel electrode 120.

Figure 2:
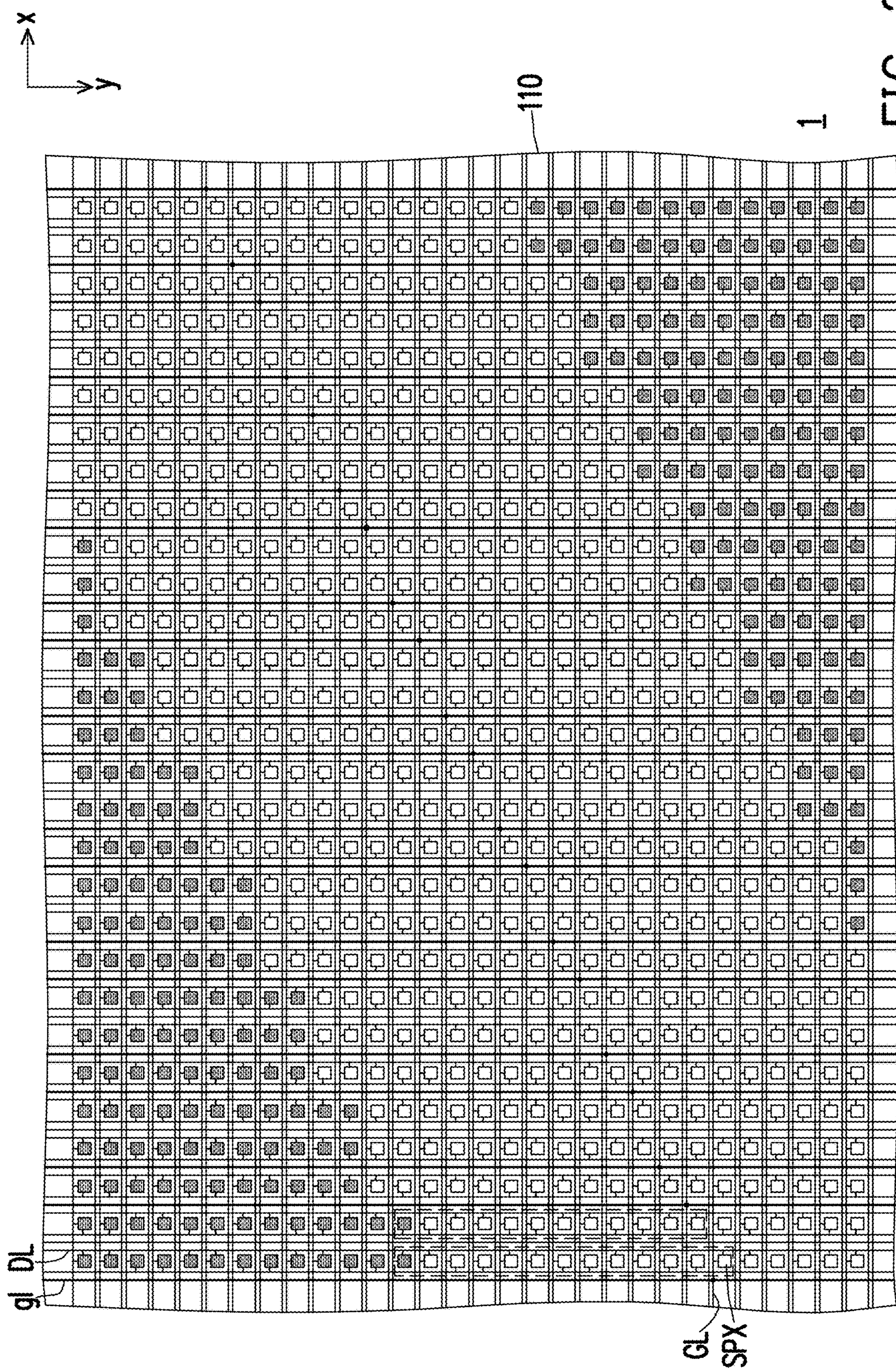
FIG. 2 is a schematic top view of the pixel array substrate 1 according to an embodiment of the disclosure.

FIG. 2 is a schematic top view of the pixel array substrate 1 according to an embodiment of the disclosure.

With reference to FIG. 2, the pixel array substrate 1 includes a plurality of data lines DL and a plurality of gate lines GL, which are disposed on the first substrate 110. The data lines DL are arranged in a first direction x, and the gate lines GL are arranged in a second direction y, where the first direction x intersects the second direction y. The pixel array substrate 1 also includes a plurality of transfer lines gl, which are disposed on the first substrate 110 and arranged in the first direction x. The transfer lines gl arranged in the first direction x are electrically connected to the gate lines GL arranged in the second direction y.

With reference to FIG. 1, in this embodiment, the display panel 10 may also selectively include a plurality of color resists 130, which are respectively overlapped with the pixel electrodes 120 of the pixel structures SPX. For example, in this embodiment, the color resists 130 may be selectively disposed on the same first substrate 110 with the pixel structures SPX to form a color filter on array (COA) structure. Nonetheless, the disclosure is not limited thereto. In another embodiment, the color resists 130 may also be selectively disposed on the second substrate 210. In yet another embodiment, the display panel 10 may also selectively not include the color resists 130.

The display panel 10 also includes a first sealant 6, which is disposed between the first substrate 110 of the pixel array substrate 1 and the second substrate 210 of the opposite substrate 2, and is located on the peripheral area 110*b* of the first substrate 110. In the first substrate 110, the area enclosed by the first sealant 6 is the active area 110*a*, and the area occupied by the first sealant 6 and the area located on the periphery of the first sealant 6 are the peripheral area 110*b*.

In this embodiment, the peripheral area 110*b* of the first substrate 110 may include a protruding portion 110*b*-1 beyond the second substrate 210, the display panel 10 may also include at least one light-blocking pattern 140, and the at least one light-blocking pattern 140 is disposed on the protruding portion 110*b*-1 of the first substrate 110.

In this embodiment, a side wall 214 of the second substrate 210 may be overlapped with the at least one light-blocking pattern 140. That is to say, a vertical projection of the side wall 214 of the second substrate 210 on the first substrate 110 may be overlapped with a vertical projection of the at least one light-blocking pattern 140 on the first substrate 110. Nonetheless, the disclosure is not limited thereto. In other embodiments, an assembly offset between the pixel array substrate 1 and the opposite substrate 2 may also cause the light-blocking pattern 140 to be misaligned and not overlapped with the side wall 214 of the second substrate 210.

In this embodiment, the at least one light-blocking pattern 140 may selectively include at least one electrically conductive pattern 141. In this embodiment, a material of the electrically conductive pattern 141 includes, for example, metal. Nonetheless, the disclosure is not limited thereto. In other embodiments, the material of the electrically conductive pattern 141 may also include other conductive materials that shields light, such as but not limited to alloys.

In this embodiment, in order to simplify the manufacturing process, the at least one electrically conductive pattern 141 may be selectively manufactured together with at least one of the source Ta, the drain Tb, and the gate Tc of the thin film transistor T, and the material of the at least one electrically conductive pattern 141 may be the same as a material of at least one of the source Ta, the drain Tb, and the gate Tc of the thin film transistor T.

For example, in this embodiment, the at least one electrically conductive pattern 141 may be manufactured together with the source Ta and/or the drain Tb of the thin film transistor T, and the material of the at least one electrically conductive pattern 141 may be the same as the material of the source Ta and/or the drain Tb of the thin film transistor T. Nonetheless, the disclosure is not limited thereto. In another embodiment, the at least one electrically conductive pattern 141 may also be manufactured together with the gate Tc of the thin film transistor T, and the material of the at least one electrically conductive pattern 141 may be the same as the material of the gate Tc of the thin film transistor T. In yet another embodiment, the at least one electrically conductive pattern 141 may include a plurality of electrically conductive patterns (not shown) that are stacked, the electrically conductive patterns may be manufactured together with the gate Tc and the source Ta of the thin film transistor T, and materials of the electrically conductive patterns may respectively be the same as the materials of the gate Tc and the source Ta of the thin film transistor T. In still another embodiment, the at least one electrically conductive pattern 141 may include a plurality of electrically conductive patterns (not shown) that are stacked, the electrically conductive patterns may be manufactured together with the gate Tc and the drain Tb of thin film transistor T, and materials of the electrically conductive patterns may respectively be the same as the materials of the gate Tc and the drain Tb of the thin film transistor T.

The display panel 10 also includes a light-shielding pattern layer 220. In this embodiment, the light-shielding pattern layer 220 may be selectively disposed on the second substrate 210 and located between the second substrate 210 and the display medium 3. The light-shielding pattern layer 220 has a plurality of openings 222, the openings 222 are respectively overlapped with the pixel electrodes 120 of the pixel structures SPX. The light-shielding pattern layer 220 is namely the commonly known black matrix (BM).

In this embodiment, the light-shielding pattern layer 220 includes a side wall 224 located above the peripheral area 110*b* of the first substrate 110, and the at least one light-blocking pattern 140 may be overlapped with the side wall 224 of the light-shielding pattern layer 220 located above the peripheral area 110*b*. That is to say, a vertical projection of an outer contour of the light-shielding pattern layer 220 defined by the side wall 224 on the first substrate 110 may be overlapped with the vertical projection of the at least one light-blocking pattern 140 on the first substrate 110. Nonetheless, the disclosure is not limited thereto. In other embodiments, an assembly offset between the pixel array substrate 1 and the opposite substrate 2 may also cause the at least one light-blocking pattern 140 to be misaligned and not overlapped with the side wall 224 of the light-shielding pattern layer 220.

The display panel 10 also includes a second sealant 7, which is disposed on a side wall 114 of the first substrate 110 and the side wall 214 of the second substrate 210. In this embodiment, the second sealant 7 is further disposed between the at least one light-blocking pattern 140 and the second polarizer 5, on at least one side wall 140*s* of the at least one light-blocking pattern 140, and on the side wall 224 of the light-shielding pattern layer 220.

The second sealant 7 includes a convex surface 7*a*, which is overlapped with the side wall 114 of the first substrate 110 and the side wall 214 of the second substrate 210. In this embodiment, the convex surface 7*a* of the second sealant 7 is further overlapped with the at least one side wall 140*s* of the light-blocking pattern 140 and the side wall 224 of the light-shielding pattern layer 220.

An optical density (OD) of the second sealant 7 is greater than or equal to 0.68. For example, in this embodiment, the optical density of the second sealant 7 is OD, and due to material limitations, $0.68 \le OD \le 2.5$. Furthermore, $0.68 \le OD \le 1.06$, but the disclosure is not limited thereto. The optical density of the second sealant 7 refers to a value measured when a film thickness of the second sealant 7 is substantially equal to 160 μm.

The first polarizer 4 is disposed on the first substrate 110, and the first substrate 110 is located between the display medium 3 and the first polarizer 4. The second polarizer 5 is disposed on the second substrate 210, and the second substrate 210 is located between the display medium 3 and the second polarizer 5. In this embodiment, the second polarizer 5 may include a protruding portion 5-1 beyond the second substrate 210, and a portion of the second sealant 7 is disposed between the protruding portion 5-1 of the second polarizer 5 and the at least one light-blocking pattern 140.

It is worth mentioning that, since the optical density of the second sealant 7 is greater than or equal to 0.68, the second sealant 7 blocks a light beam emitted by the backlight module (not shown) disposed beneath the display panel 10, preventing the light beam from leaking from above the protruding portion 110*b*-1 of the first substrate 110. Thereby, light leakage on the side of the display panel 10 is improved. Besides, in this embodiment, the at least one light-blocking pattern 140 disposed on the protruding portion 110*b*-1 of the first substrate 110 also blocks the light beam emitted by the backlight module (not shown), further improving light leakage on the side.

It should be noted herein that the reference numerals and part of the content of the above embodiment remain to be used in the following embodiments, the same or similar reference numerals are adopted to represent the same or similar elements, and the description of the same technical content is omitted. Reference may be made to the above embodiment for the description of the omitted part, which will not be repeated in the following embodiments.

Figure 3:
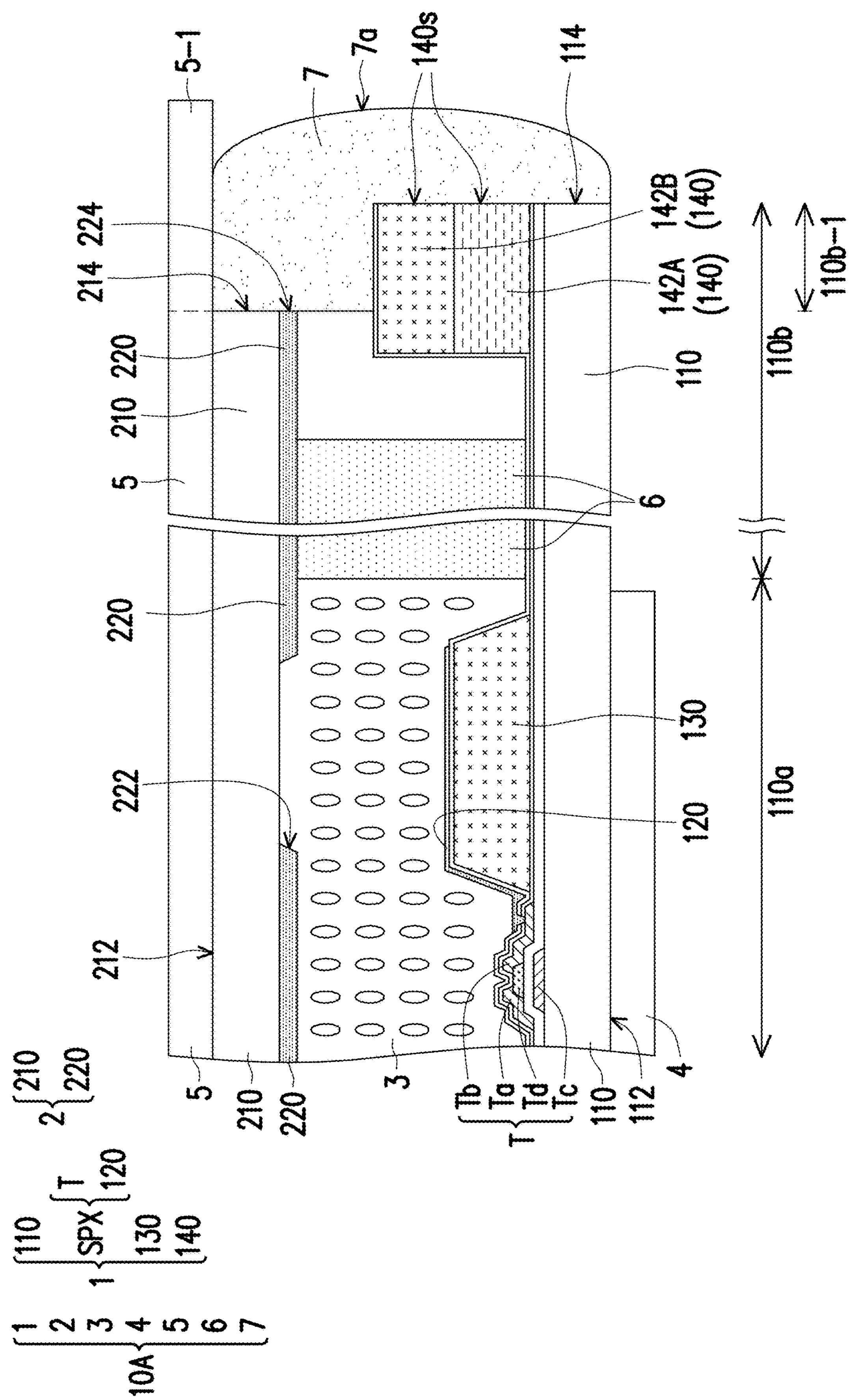
FIG. 3 is a schematic cross-sectional view of a display panel 10A according to an embodiment of the disclosure.

FIG. 3 is a schematic cross-sectional view of a display panel 10A according to an embodiment of the disclosure.

The display panel 10A of FIG. 3 is similar to the display panel 10 of FIG. 1. The difference between the two lies in: the at least one light-blocking pattern 140 of FIG. 3 is different from the at least one light-blocking pattern 140 of FIG. 1.

With reference to FIG. 3, specifically, in this embodiment, the at least one light-blocking pattern 140 may selectively include at least one light-filtering pattern 142A, 142B. In this embodiment, in order to simplify the manufacturing process, the at least one light-filtering pattern 142A, 142B located on the peripheral area 110*b* may be selectively formed together with the at least one color resist 130 located on the active area 110*a*, and a material of the at least one light-filtering pattern 142A, 142B may be the same as a material of the at least one color resist 130.

For example, in this embodiment, the at least one light-filtering pattern 142A, 142B may include a plurality of light-filtering patterns 142A, 142B that are stacked, and colors of the light-filtering patterns 142A and 142B are different from each other. The light-filtering pattern 142A located on the peripheral area 110*b* may be formed in the same process with the color resist 130 of a first pixel structure of the pixel structures SPX located on the active area 110*a*, and the light-filtering pattern 142A located on the peripheral area 110*b* and the color resist 130 of the first pixel structure located on the active area 110*a* may include the same material and be in the same color. The light-filtering pattern 142B located on the peripheral area 110*b* may be formed in the same process with the color resist 130 of a second pixel structure of the pixel structures SPX located on the active area 110*a*, and the light-filtering pattern 142B located on the peripheral area 110*b* and the color resist 130 of the second pixel structure located on the active area 110*a* may include the same material and be in the same color.

In this embodiment, the first pixel structure and the second pixel structure are, for example, respectively configured to display red and blue, and the color of the light-filtering pattern 142A and the color of the light-filtering pattern 142B are, for example, red and blue. Nonetheless, the disclosure is not limited thereto. In other embodiments, the colors of the light-filtering pattern 142A and the light-filtering pattern 142B may also be combinations of other colors. For example, in an embodiment, the colors of the light-filtering pattern 142A and the light-filtering pattern 142B may be red and green. In another embodiment, the colors of the light-filtering pattern 142A and the light-filtering pattern 142B may be green and blue.

Besides, in this embodiment, the at least one light-filtering pattern 142A, 142B disposed on the peripheral area 110*b* are not limited to two light-filtering patterns as shown in FIG. 3. In an embodiment, the at least one light-filtering pattern 142A, 142B disposed on the peripheral area 110*b* may also include one, three, or more than three light-filtering patterns.

Figure 4:
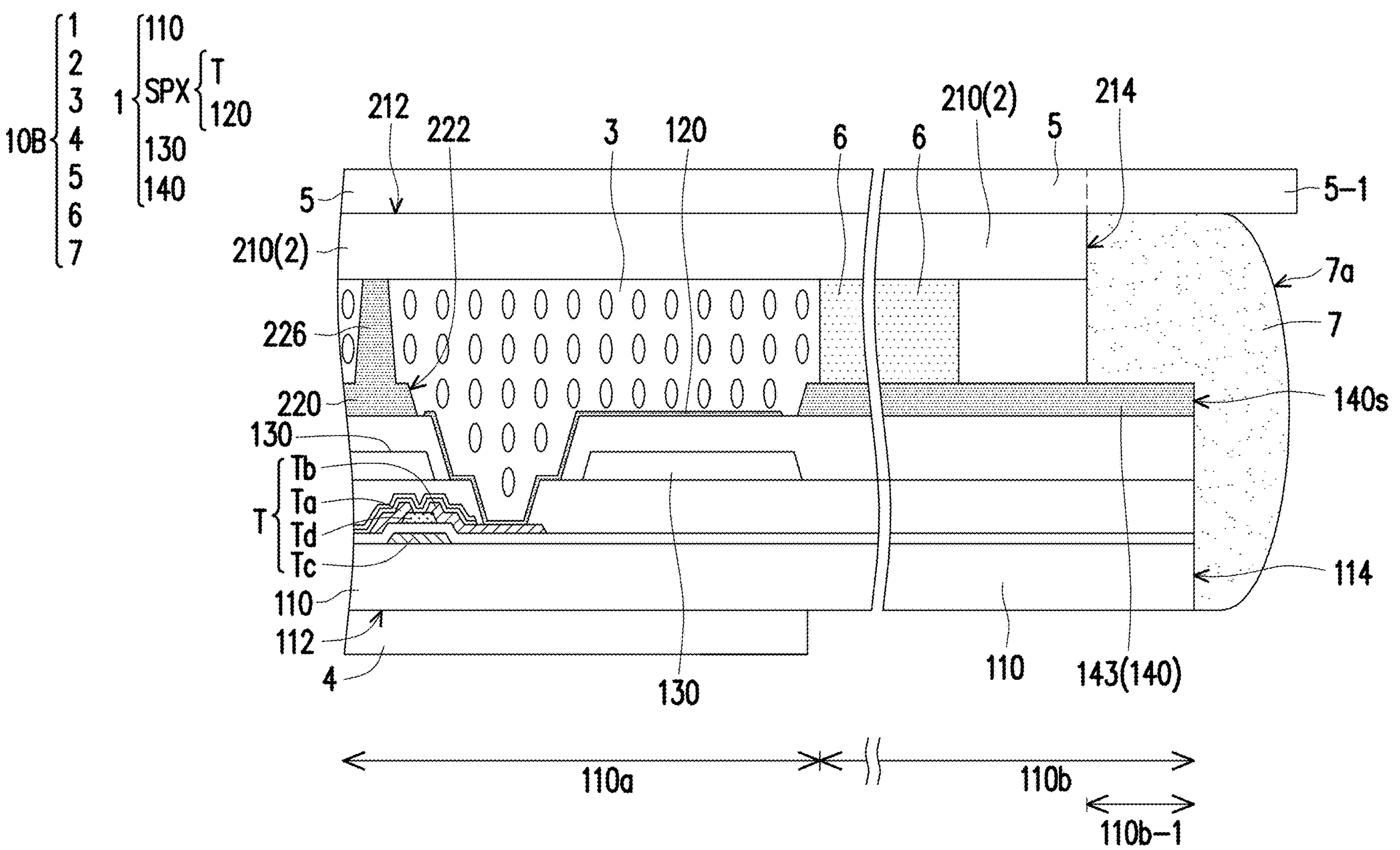
FIG. 4 is a schematic cross-sectional view of a display panel 10B according to an embodiment of the disclosure.

FIG. 4 is a schematic cross-sectional view of a display panel 10B according to an embodiment of the disclosure.

The display panel 10B of FIG. 4 is similar to the display panel 10 of FIG. 1. The difference between the two lies in: the at least one light-blocking pattern 140 of FIG. 4 is different from the at least one light-blocking pattern 140 of FIG. 1.

With reference to FIG. 4, specifically, in this embodiment, the at least one light-blocking pattern 140 may selectively include a light-shielding resist 143, such as but not limited to a black photoresist.

In this embodiment, the display panel 10 also includes a supporter 226 that is disposed on the active area 110*a* of the first substrate 110 and abuts against the second substrate 210. The supporter 226 may also be referred to as a spacer. In this embodiment, the light-shielding pattern layer 220 and the pixel structures SPX may be selectively disposed on the same first substrate 110 to form a black matrix on array (BOA) structure. In this embodiment, when the light-shielding pattern layer 220 is formed, the supporter 226 may also be selectively formed at the same time. In this embodiment, in order to simplify the manufacturing process, the light-shielding resist 143 is, for example, formed in the same manufacturing process together with the supporter 226, and a material of the light-shielding resist 143 may be the same as a material of the supporter 226. Nonetheless, the disclosure is not limited thereto. In another embodiment, the light-shielding resist 143 may also not be formed together with the supporter 226 and/or the light-shielding pattern layer 220, and the light-shielding resist 143 may also be utilized in a display panel with a non-black matrix on array (BOA) structure.

Figure 5:
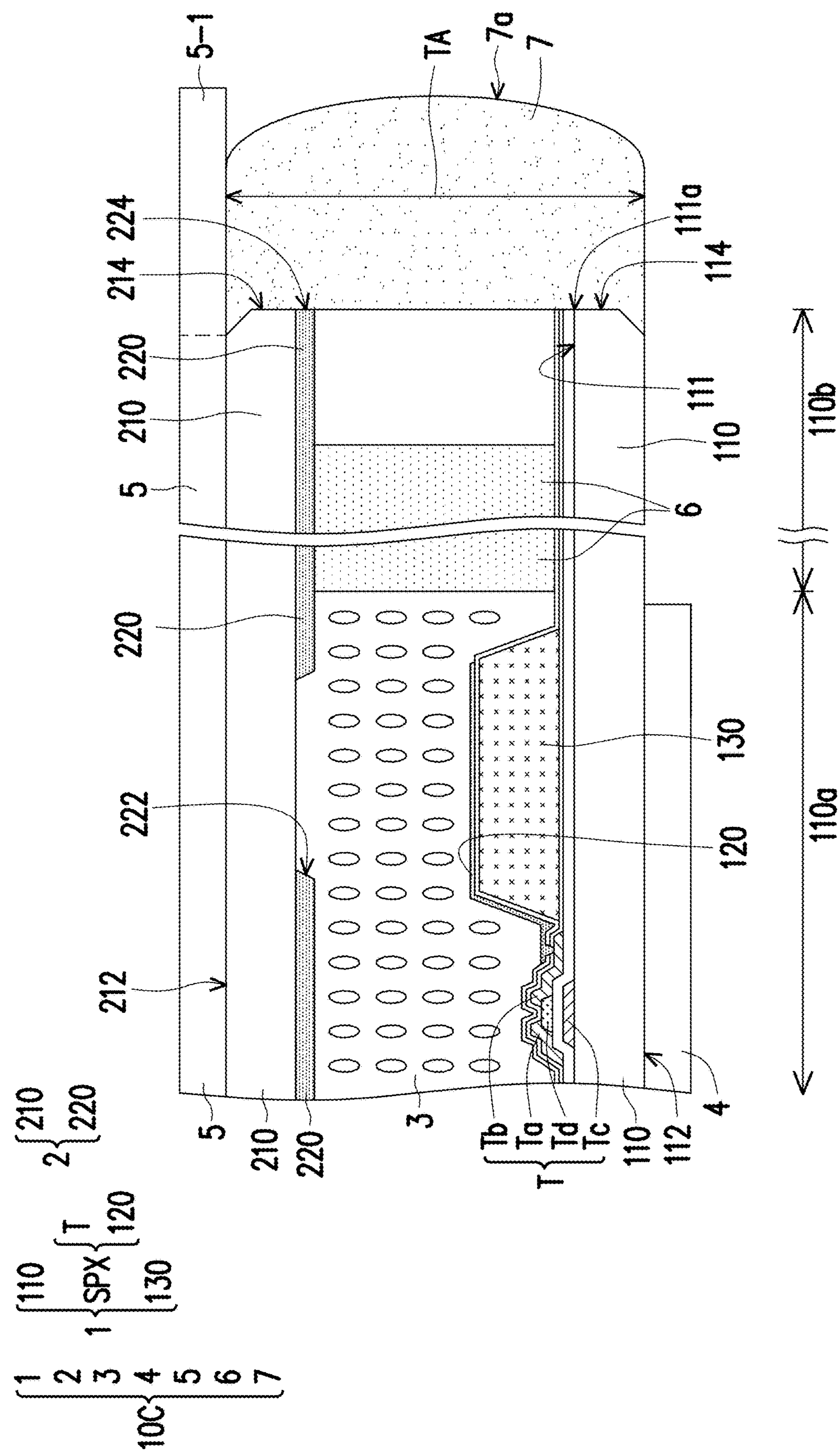
FIG. 5 is a schematic cross-sectional view of a display panel 10C according to an embodiment of the disclosure.

FIG. 5 is a schematic cross-sectional view of a display panel 10C according to an embodiment of the disclosure.

The display panel 10C of FIG. 5 is similar to the display panel 10 of FIG. 1. The difference between the two lies in: the first substrate 110 of FIG. 5 does not include the protruding portion 110*b*-1 of FIG. 1.

With reference to FIG. 5, specifically, in the manufacturing process of the display panel 10C, after the pixel array substrate 1 and the opposite substrate 2 are assembled and before the first polarizer 4 and the second polarizer 5 are attached, a polishing process is performed on the pixel array substrate 1 and the opposite substrate 2. In addition, the side wall 114 of the first substrate 110 of the pixel array substrate 1 is substantially aligned with the side wall 214 of the second substrate 210 of the opposite substrate 2.

Figure 6B:
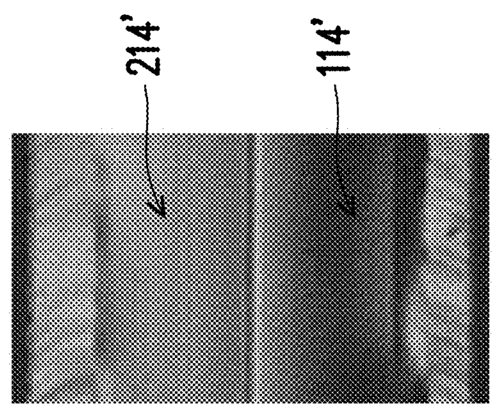
FIG. 6B shows a side wall 114' of a first substrate and a side wall 214' of a second substrate of a display panel according to a comparative example.
Figure 6A:
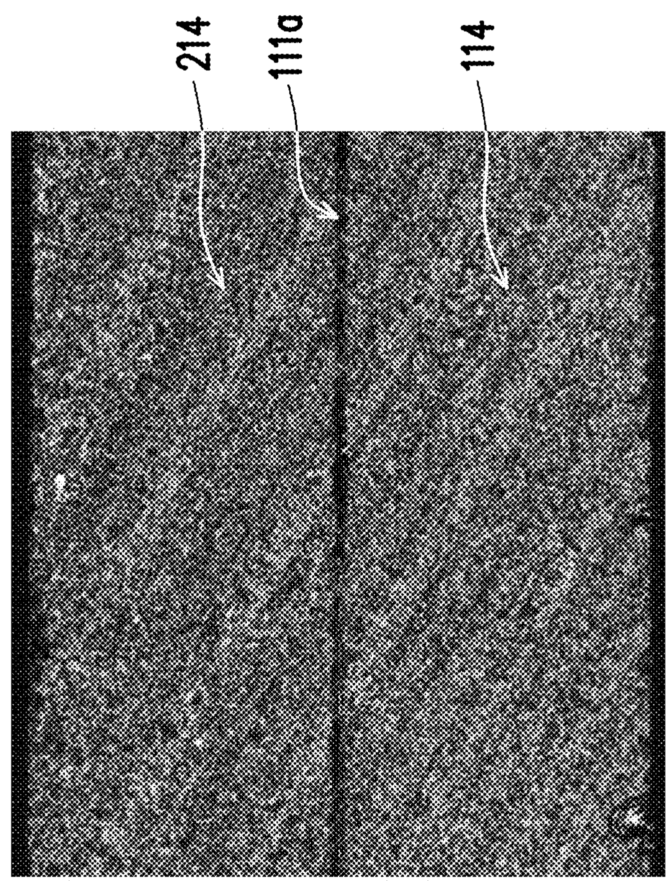
FIG. 6A shows the side wall 114 of the first substrate 110 and the side wall 214 of the second substrate 210 of the display panel 10C according to an embodiment of the disclosure.

FIG. 6A shows the side wall 114 of the first substrate 110 and the side wall 214 of the second substrate 210 of the display panel 10C according to an embodiment of the disclosure. FIG. 6B shows a side wall 114' of a first substrate and a side wall 214' of a second substrate of a display panel according to a comparative example. The side wall 114 of the first substrate 110 and the side wall 214 of the second substrate 210 of FIG. 6A are polished, and the side wall 114' of the first substrate and the side wall 214' of the second substrate of FIG. 6B are not polished.

With reference to FIG. 5 and FIG. 6A, in this embodiment, the pixel array substrate 1 and the opposite substrate 2 are polished, and the side wall 114 of the first substrate 110 and the side wall 214 of the second substrate 210 are rough surfaces. By direct observation, the side wall 114 of the first substrate 110 and the side wall 214 of the second substrate 210 are matte surfaces as shown in FIG. 6A. With reference to FIG. 5 and FIG. 6A, the first substrate 110 includes a carrying surface 111, the pixel structures SPX are disposed on the carrying surface 111, and a junction 111*a* is present between the side wall 114 and the carrying surface 111 of the first substrate 110. As indicated by a comparison between FIG. 6A and FIG. 6B, after polishing, the side wall 114 of the first substrate 110 and the side wall 214 of the second substrate 210 have stripes that are inclined relative to the junction 111*a*.

With reference to FIG. 5, the second sealant 7 is disposed on the side wall 114 of the first substrate 110 and the side wall 214 of the second substrate 210. In addition, the optical density of the second sealant 7 is greater than or equal to 0.68, and the display device 10C is not likely to give rise to light leakage on the side. Table 1 below shows experimental results of various display panels including the second sealant 7 of the same thickness TA (e.g., 160 μm) and different optical densities. With reference to Table 1 below, as shown in the experimental results thereof, when the optical density of the second sealant 7 is greater than or equal to 0.68, the display device 10C is less likely to give rise to light leakage on the side.

TABLE 1

| Optical density of second sealant 7 | 0.13 | 0.45 | 0.68 | 0.83 | 1.06 |
|---|---|---|---|---|---|
| Light leakage on the side | Yes | Yes | No | No | No |

FIG. 7A to FIG. 7F are schematic cross-sectional views of a display panel 10D according to an embodiment of the disclosure.

Figure 7A:
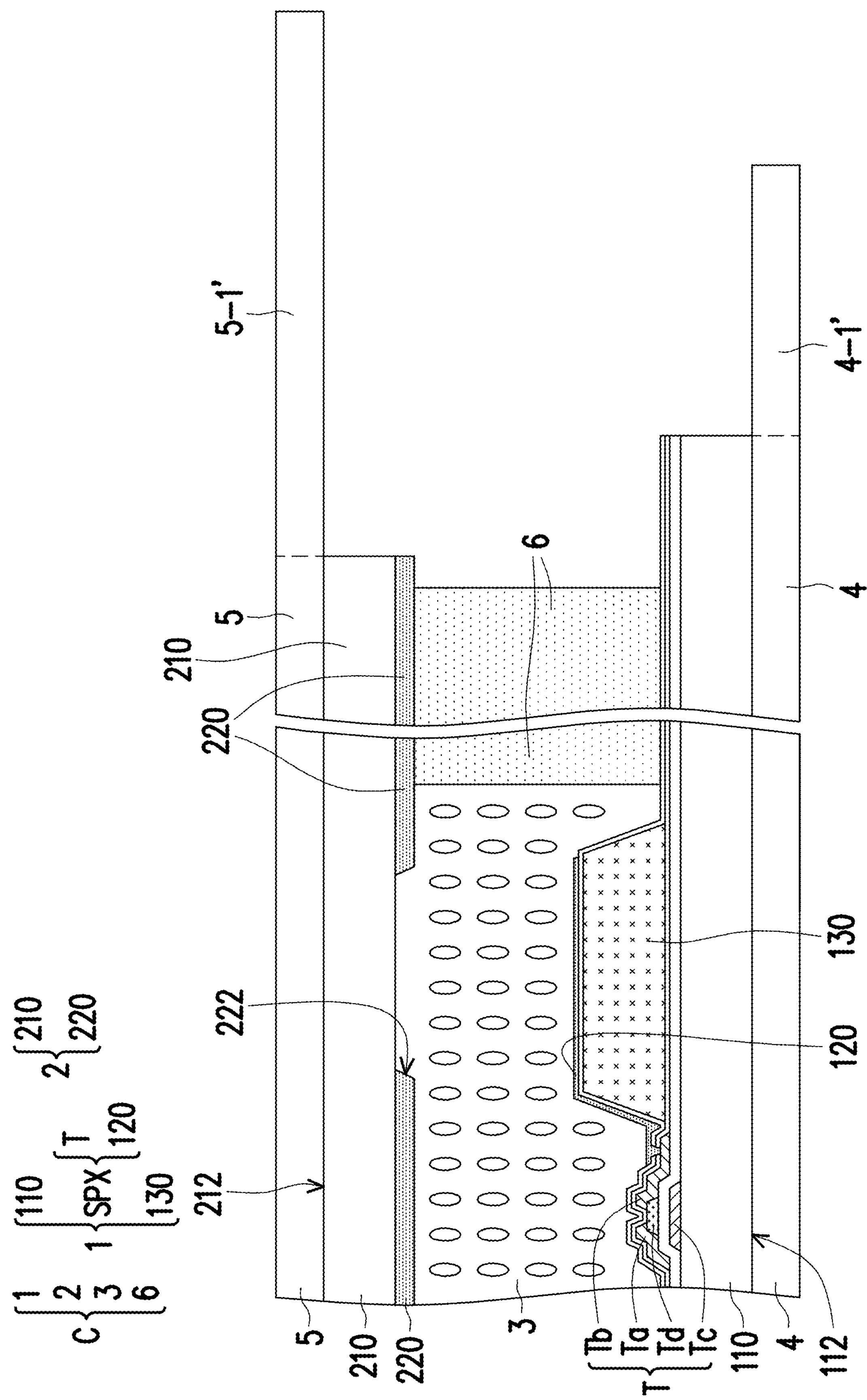
FIG. 7A to FIG. 7F are schematic cross-sectional views of a display panel 10D according to an embodiment of the disclosure.

With reference to FIG. 7A, a cell C is firstly provided. The cell C includes the first sealant 6, the pixel array substrate 1 and the opposite substrate 2 connected to each other by the first sealant 6, and the display medium 3 disposed in a space enclosed by the first sealant 6, the pixel array substrate 1, and the opposite substrate 2. Next, the first polarizer 4 and the second polarizer 5 are respectively attached to the outer surface 112 of the first substrate 110 of the pixel array substrate 1 and the outer surface 212 of the second substrate

210 of the opposite substrate 2. The first substrate 110 is located between the display medium 3 and the first polarizer 4, and the first polarizer 4 includes an extending portion 4-1' beyond the first substrate 110. The second substrate 210 is located between the second polarizer 5 and the display medium 3, and the second polarizer 5 includes an extending portion 5-1' beyond the second substrate 210.

Figure 7B:
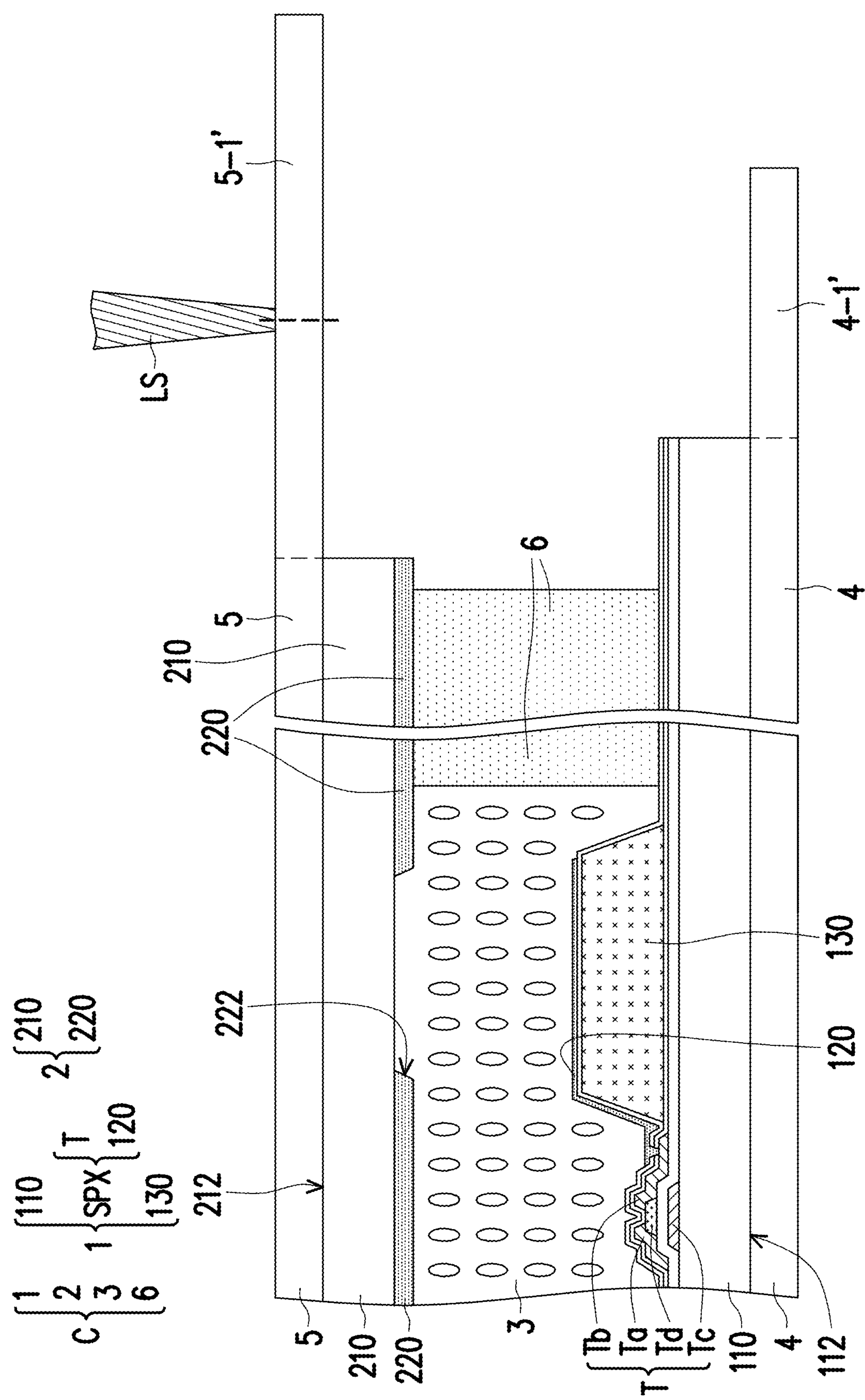
Figure 7C:
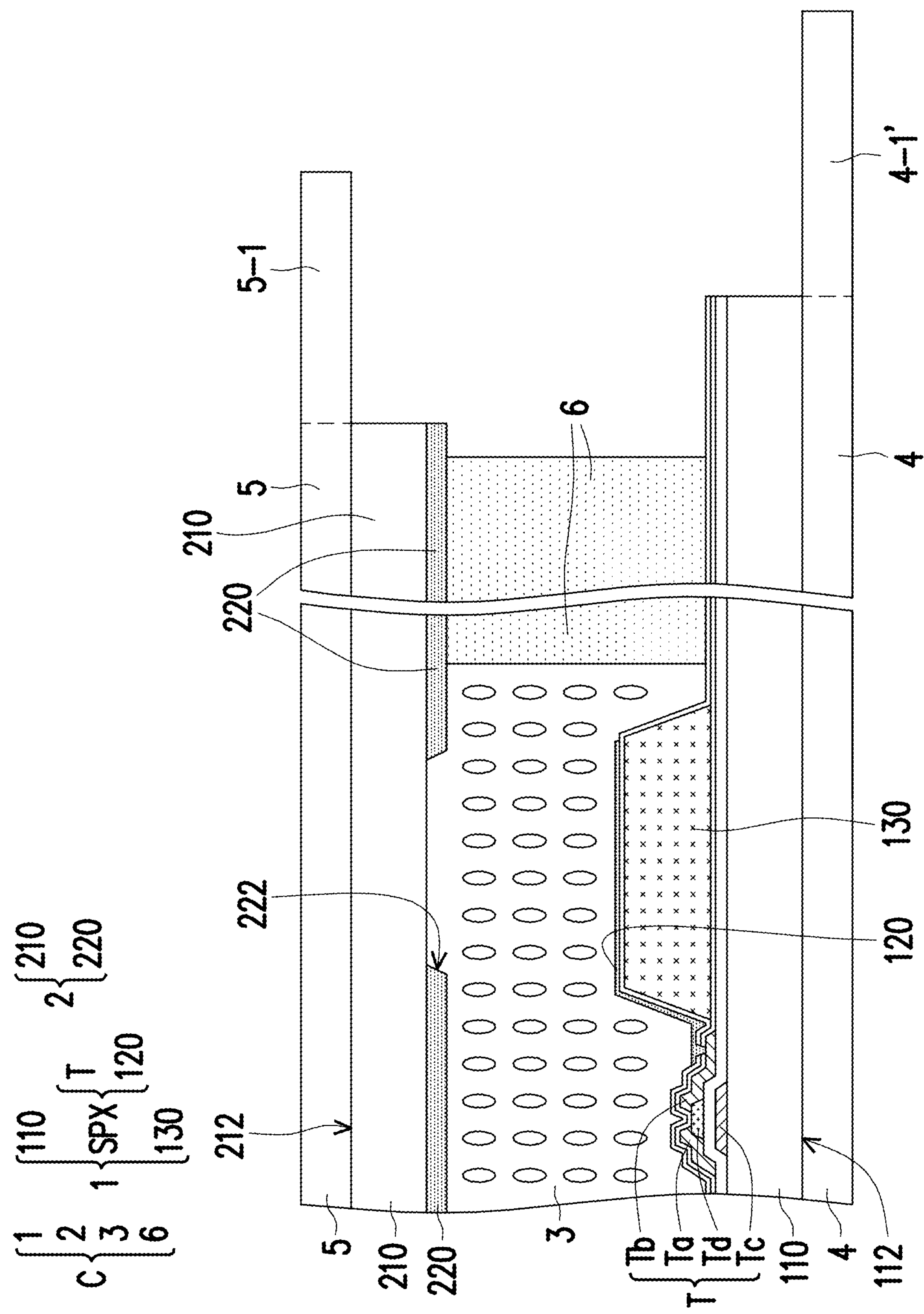

Next, with reference to FIG. 7B and FIG. 7C, a portion of the extending portion 5-1' of the second polarizer 5 is removed to form the protruding portion 5-1 of the second polarizer 5, and the protruding portion 5-1 of the second polarizer 5 is beyond the second substrate 210. For example, in this embodiment, a laser LS may be utilized to cut a portion of the extending portion 5-1' of the second polarizer 5 to form the protruding portion 5-1, but the disclosure is not limited thereto.

Figure 7D:
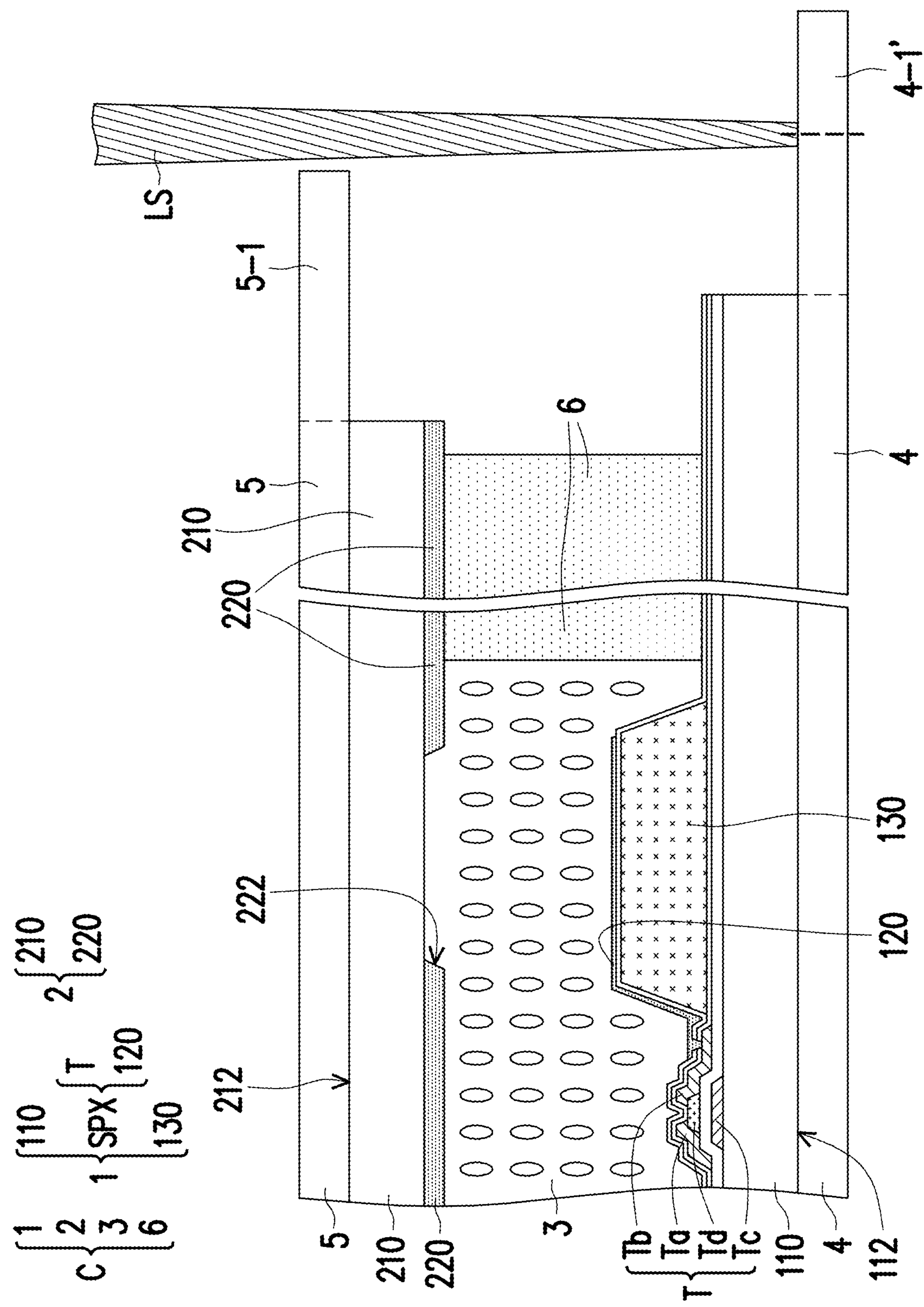
Figure 7E:
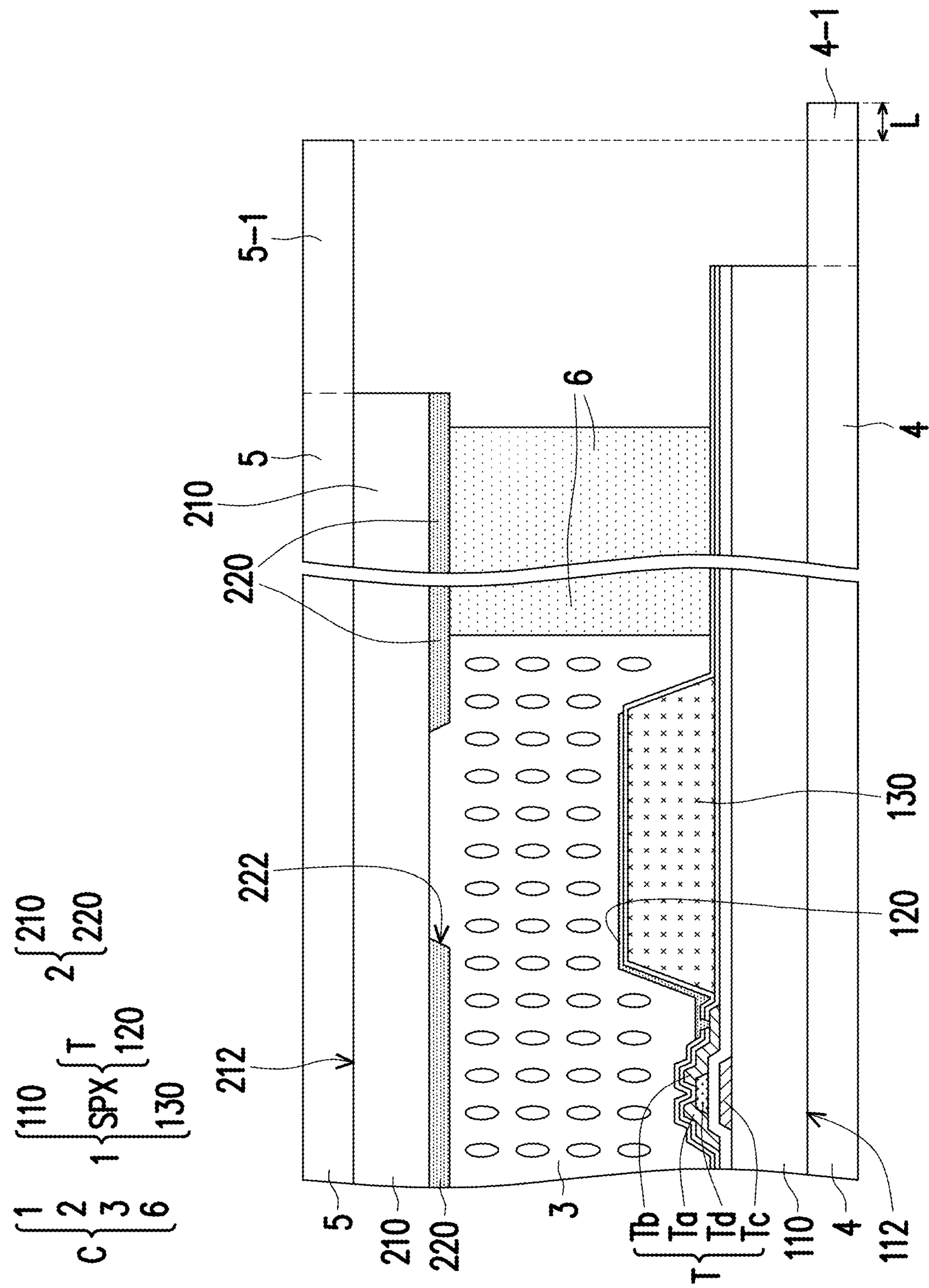

Then, with reference to FIG. 7D and FIG. 7E, a portion of the extending portion 4-1' of the first polarizer 4 is removed to form a protruding portion 4-1 of the first polarizer 4, and the protruding portion 4-1 of the first polarizer 4 is beyond the first substrate 110. For example, in this embodiment, the laser LS may be utilized to cut a portion of the extending portion 4-1' of the first polarizer 4 to form the protruding portion 4-1, but the disclosure is not limited thereto.

In this embodiment, the first polarizer 4 is cut after the second polarizer 5 is cut. During cutting of the first polarizer 4, the laser LS utilized to cut the first polarizer 4 will pass by the side of the second polarizer 5 that has been cut without damage to the second polarizer 5. Therefore, after the cutting of the first polarizer 4 and the second polarizer 5 is completed, the protruding portion 4-1 of the first polarizer 4 is slightly beyond the protruding portion 5-1 of the second polarizer 5, as shown in FIG. 7E. For example, in this embodiment, a length L of the portion of the protruding portion 4-1 of the first polarizer 4 that is beyond the protruding portion 5-1 of the second polarizer 5 falls approximately within a range of 100 μm to 200 μm, but the disclosure is not limited thereto.

Figure 7F:
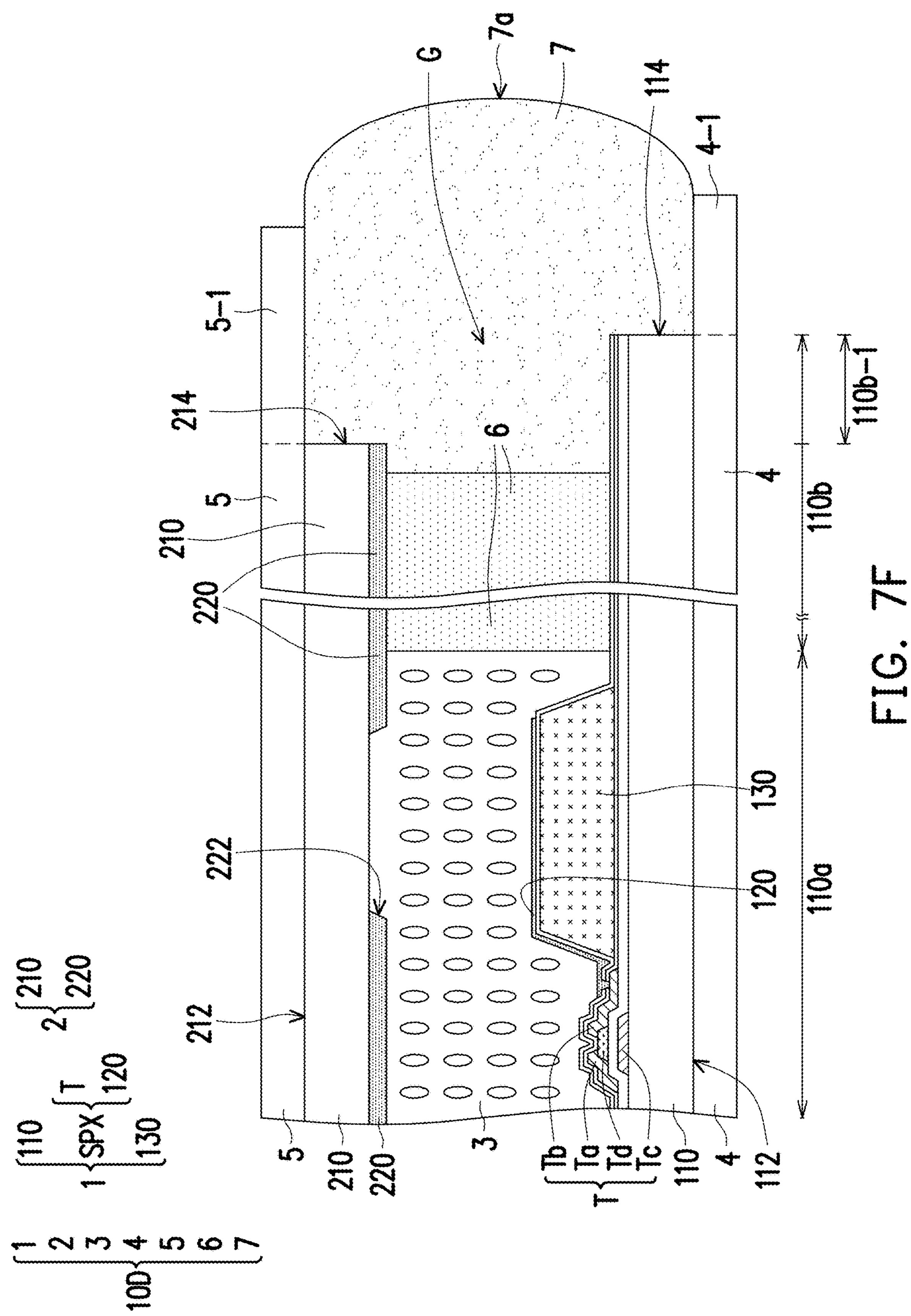

Lastly, with reference to FIG. 7F, the second sealant 7 is formed in a space G enclosed by the protruding portion 4-1 of the first polarizer 4, the side wall 114 of the first substrate 110, the side wall 214 of the second substrate 210, and the protruding portion 5-1 of the second polarizer 5. At this time, the display device 10D of the embodiment is completed.

The display panel 10D of FIG. 7F is similar to the display panel 10 of FIG. 1. The difference between the two lies in: it is possible that the display panel 10D of FIG. 7F does not include the light-blocking pattern 140 of the display panel 10 of FIG. 1. Besides, in the embodiment of FIG. 7F, the first polarizer 4 may extend beyond the side wall 114 of the first substrate 110.

Figure 8:
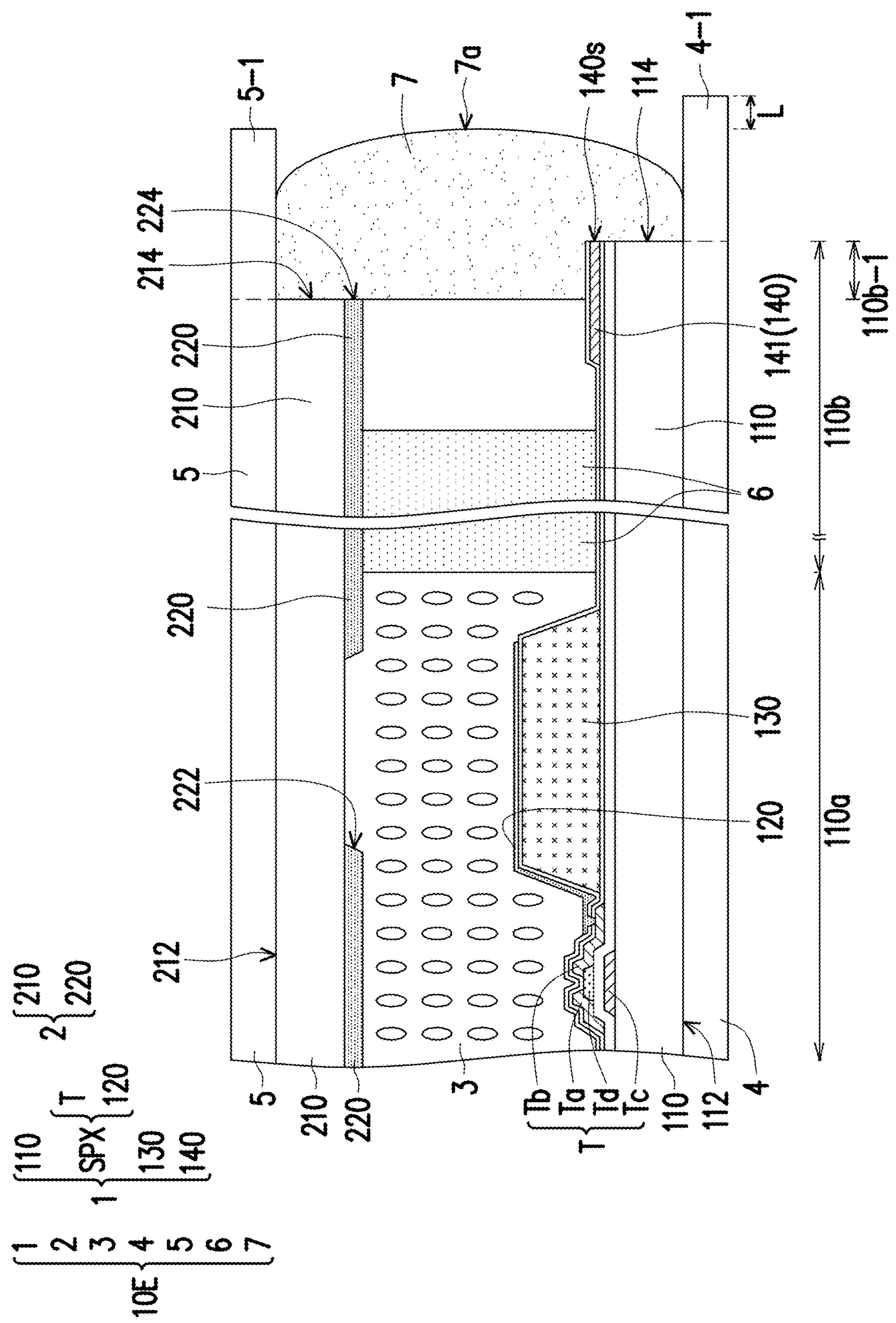
FIG. 8 is a schematic cross-sectional view of a display panel 10E according to an embodiment of the disclosure.

FIG. 8 is a schematic cross-sectional view of a display panel 10E according to an embodiment of the disclosure.

The display panel 10E of FIG. 8 is similar to the display panel 10 of FIG. 1. The difference between the two lies in: in the embodiment of FIG. 1, the first polarizer 4 does not extend beyond the side wall 114 of the first substrate 110, but in the embodiment of FIG. 8, the first polarizer 4 extends beyond the side wall 114 of the first substrate 110. The manufacturing process of the display panel 10E of FIG. 8 is similar to the manufacturing process of the display panel 10D of FIG. 7F, and thus will not be repeated herein.

Figure 9:
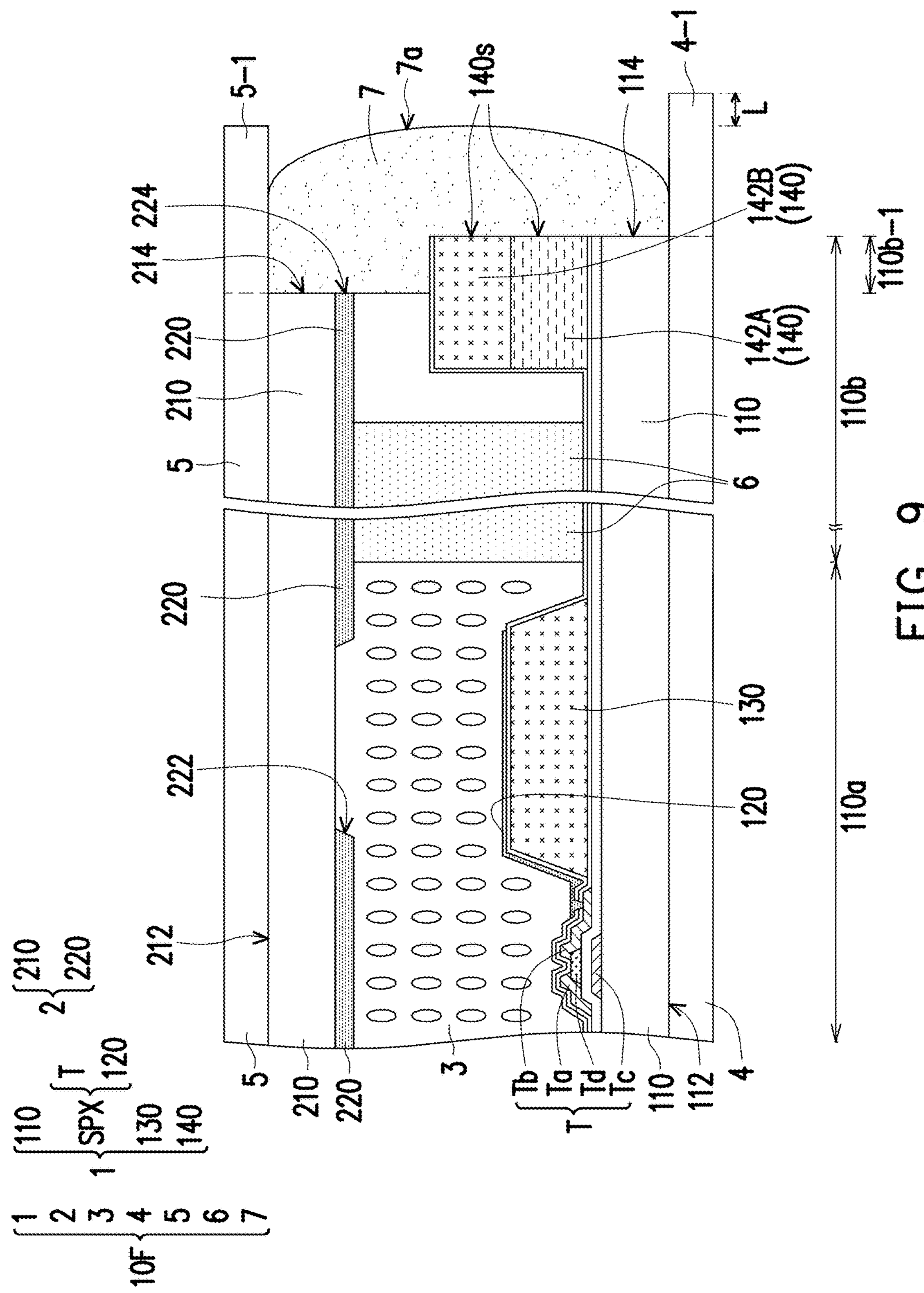
FIG. 9 is a schematic cross-sectional view of a display panel 10F according to an embodiment of the disclosure.

FIG. 9 is a schematic cross-sectional view of a display panel 10F according to an embodiment of the disclosure.

The display panel 10F of FIG. 9 is similar to the display panel 10A of FIG. 3. The difference between the two lies in: in the embodiment of FIG. 3, the first polarizer 4 does not extend beyond the side wall 114 of the first substrate 110, but in the embodiment of FIG. 9, the first polarizer 4 extends beyond the side wall 114 of the first substrate 110. The manufacturing process of the display panel 10F of FIG. 9 is similar to the manufacturing process of the display panel 10D of FIG. 7F, and thus will not be repeated herein.

Figure 10:
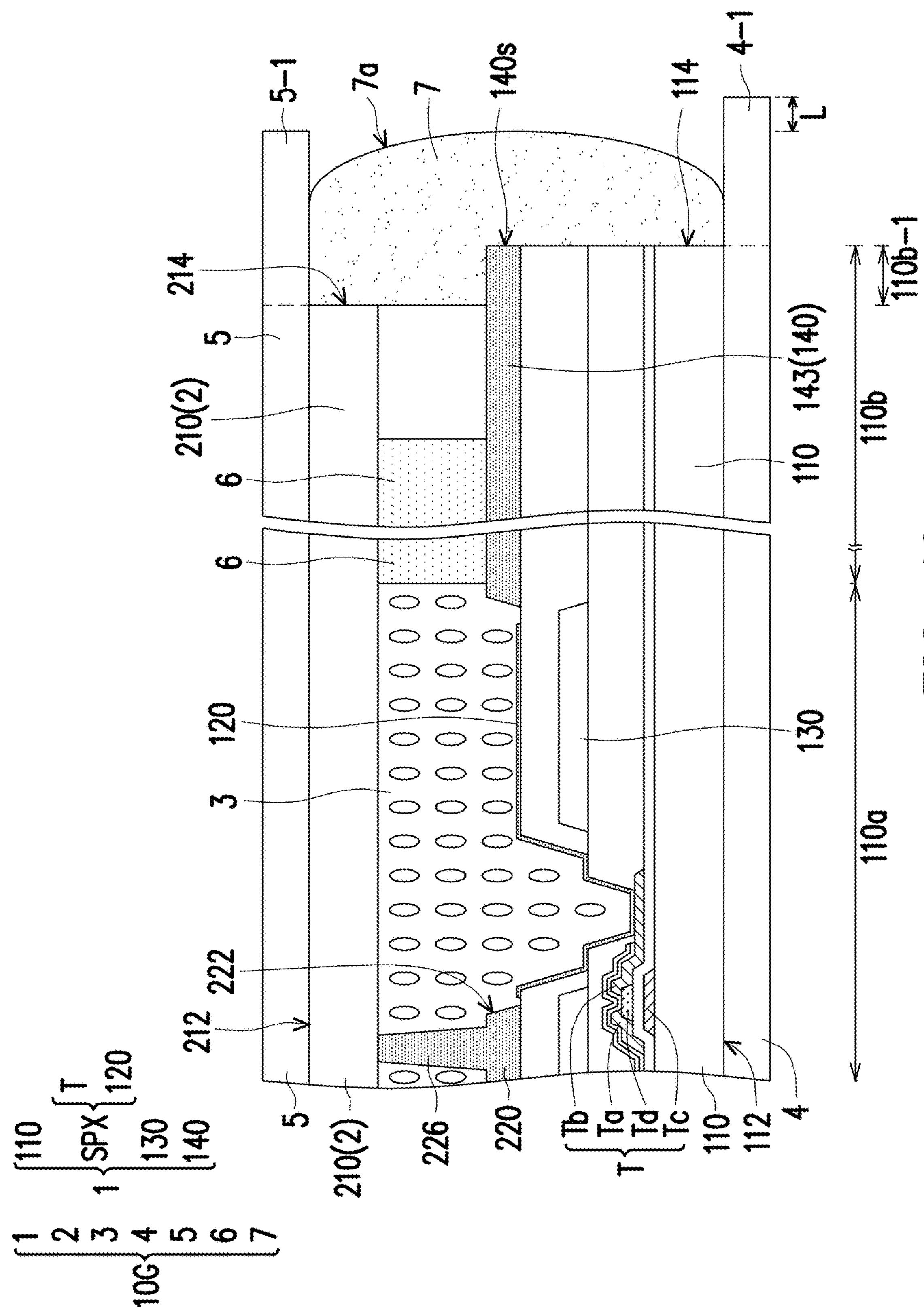
FIG. 10 is a schematic cross-sectional view of a display panel 10G according to an embodiment of the disclosure.

FIG. 10 is a schematic cross-sectional view of a display panel 10G according to an embodiment of the disclosure.

The display panel 10G of FIG. 10 is similar to the display panel 10B of FIG. 4. The difference between the two lies in: in the embodiment of FIG. 4, the first polarizer 4 does not extend beyond the side wall 114 of the first substrate 110, but in the embodiment of FIG. 10, the first polarizer 4 extends beyond the side wall 114 of the first substrate 110. The manufacturing process of the display panel 10G of FIG. 10 is similar to the manufacturing process of the display panel 10D of FIG. 7F, and thus will not be repeated herein.

Figure 11:
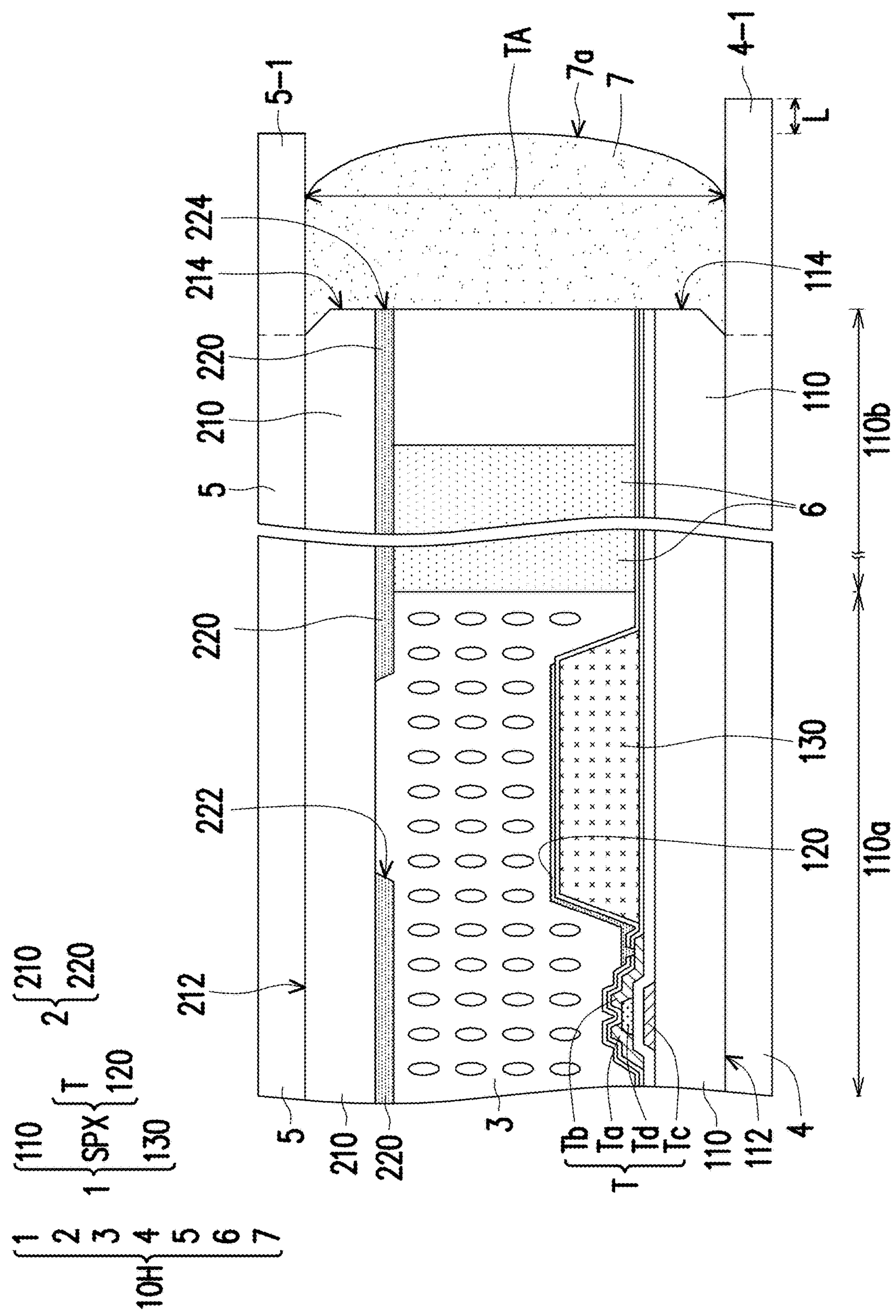
FIG. 11 is a schematic cross-sectional view of a display panel 10H according to an embodiment of the disclosure.

FIG. 11 is a schematic cross-sectional view of a display panel 10H according to an embodiment of the disclosure.

The display panel 10H of FIG. 11 is similar to the display panel 10C of FIG. 5. The difference between the two lies in: in the embodiment of FIG. 5, the first polarizer 4 does not extend beyond the side wall 114 of the first substrate 110, but in the embodiment of FIG. 11, the first polarizer 4 extends beyond the side wall 114 of the first substrate 110. The manufacturing process of the display panel 10H of FIG. 11 is similar to the manufacturing process of the display panel 10D of FIG. 7F, and thus will not be repeated herein.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display panel, comprising:
- a first substrate including an active area and a peripheral area outside the active area;
- a plurality of pixel structures disposed on the active area of the first substrate;
- a plurality of color resists, respectively overlapped with a plurality of pixel electrodes of the plurality of pixel structures, the plurality of color resists is disposed on the same first substrate with the plurality of pixel structures to form a color filter on array structure;
- a second substrate disposed opposite to the first substrate;
- a display medium disposed between the first substrate and the second substrate;
- a first sealant disposed between the first substrate and the second substrate and located on the peripheral area of the first substrate;
- a second sealant disposed on a side wall of the first substrate and a side wall of the second substrate;
  - wherein the second sealant includes a convex surface overlapped with the side wall of the first substrate and the side wall of the second substrate, and an optical density of the second sealant is greater than or equal to 0.68;
  - the first substrate includes a carrying surface, and the pixel structures are disposed on the carrying surface; and
- a plurality of light-filtering patterns disposed on the peripheral area, wherein the plurality of light-filtering patterns are stacked, colors of the light-filtering patterns are different from each other, and the plurality of light-filtering patterns extend to an edge of the first substrate.

2. The display panel as described in claim 1, wherein the optical density of the second sealant refers to a value measured when a film thickness of the second sealant is substantially equal to 160 μm.

3. The display panel as described in claim 1, wherein the optical density of the second sealant refers to a value measured when a film thickness of the second sealant is substantially equal to 160 μm, the optical density of the second sealant is OD, and $1.7<OD\leq 2.5$.

4. The display panel as described in claim 1, further comprising:

a light-shielding pattern layer, disposed on the second substrate, wherein a side wall of the light-shielding pattern layer is substantially aligned with a side wall of the second substrate.

5. The display panel as described in claim 1, further comprising:

a first polarizer disposed on the first substrate, wherein the first substrate is located between the display medium and the first polarizer, and the first polarizer includes a protruding portion beyond the first substrate;

a second polarizer disposed on the second substrate, wherein the second substrate is located between the second polarizer and the display medium, and the second polarizer includes a protruding portion beyond the second substrate;

wherein at least a portion of the second sealant is disposed in a space defined by the protruding portion of the first polarizer, the side wall of the first substrate, the side wall of the second substrate, and the protruding portion of the second polarizer.

6. The display panel as described in claim 5, wherein the side wall of the first substrate is substantially aligned with the side wall of the second substrate.

7. The display panel as described in claim 5, wherein the protruding portion of the first polarizer is beyond the protruding portion of the second polarizer.

8. The display panel as described in claim 1, wherein the side wall of the first substrate is substantially aligned with the side wall of the second substrate.

9. The display panel as described in claim 1, wherein the plurality of light-filtering patterns are overlapped with the second sealant.

10. The display panel as described in claim 9, wherein the plurality of light-filtering patterns are color resists.

11. The display panel as described in claim 1, further comprising:

a first polarizer disposed on the first substrate, wherein the first substrate is located between the display medium and the first polarizer;

a second polarizer disposed on the second substrate, wherein the second substrate is located between the second polarizer and the display medium;

a normal projection of the second polarizer is greater than a normal projection of the first polarizer.

* * * * *